United States Patent
Dimitrova et al.

(10) Patent No.: US 6,721,488 B1
(45) Date of Patent: Apr. 13, 2004

(54) METHOD AND APPARATUS TO IDENTIFY SEQUENTIAL CONTENT STORED ON A STORAGE MEDIUM

(75) Inventors: Nevenka Dimitrova, Yorktown Heights, NY (US); Evgeniy Leyvi, Fairlawn, NJ (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/451,276

(22) Filed: Nov. 30, 1999

(51) Int. Cl.[7] .................................................. H04N 5/91
(52) U.S. Cl. ............................ 386/46; 348/571; 386/95
(58) Field of Search .............................. 386/65, 95, 46, 386/60, 57; 348/460, 552, 571, 907; H04N 5/91

(56) References Cited

U.S. PATENT DOCUMENTS

| | | | |
|---|---|---|---|
| 5,459,830 A | | 10/1995 | Ohba et al. |
| 5,504,518 A | * | 4/1996 | Ellis et al. ..................... 725/22 |
| 5,543,930 A | | 8/1996 | Takano |
| 6,181,867 B1 | * | 1/2001 | Kenner et al. ................. 386/46 |
| 6,275,646 B1 | * | 8/2001 | Tada et al. .................... 386/46 |

FOREIGN PATENT DOCUMENTS

| | | | | |
|---|---|---|---|---|
| JP | 08124363 A | | 5/1996 | |
| JP | 09161455 A | | 6/1997 | |
| WO | WO9940587 | | 8/1999 | .......... G11B/27/10 |
| WO | WO 99/40587 | * | 8/1999 | .......... H04N/5/775 |

* cited by examiner

*Primary Examiner*—Vincent Boccio
*Assistant Examiner*—James A Fletcher
(74) *Attorney, Agent, or Firm*—Gregory L. Thorne

(57) ABSTRACT

A system that utilizes a determined time between characteristics from content for subsequently identifying the content and/or the corresponding content review position in the time domain. The system utilizes a database of previously stored time between characteristics from known content for matching to the determined time between characteristics from the content source. The characteristics may correspond to video tape indexing data, keyframe data, audio characteristics, text occurrences, and/or other known characteristics from the content. When a match is found between the determined time between characteristics and the stored times between characteristics, the system identifies the content. If corresponding time domain data is stored in the database, the system identifies the current content review position in the time domain. When the time between characteristics from the content does not match any of the times stored in the database, the system stores the current time between characteristics and corresponding content identifying information in the database for identifying the content at some subsequent time.

25 Claims, 1 Drawing Sheet

METHOD AND APPARATUS TO IDENTIFY SEQUENTIAL CONTENT STORED ON A STORAGE MEDIUM

FIELD OF THE INVENTION

This invention generally relates to a method and apparatus for identifying sequential content stored on a storage medium. Specifically, the present invention pertains to utilizing stored timing information and/or frame information to identify content and/or a given storage medium on which the content is stored.

BACKGROUND OF THE INVENTION

A problem exists in the usage of storage mediums for storing content that is retrieved in a sequential manner such as time sequential content. With large storage mediums, such as a digital video recording device, the storage medium may contain numerous individual content portions that can only be identified by reviewing each individual content portion. In smaller storage mediums, such as analog vertical-helical scanning (VHS) tapes, generally video tapes, the video tapes may only contain a relatively small number of individual content portions. However, a given user typically utilizes multiple video tapes and therefore the problem is further compounded in that not only must a particular content portion be identified, but a particular video tape on which the content portion is stored must also be identified.

In the prior art, there is no system for automatically identifying a given content portion or a given storage medium. For commercially recorded mediums, the manufacturer typically affixes a label to the storage medium. The label may contain identifying information such as the storage medium content, total content runtime, content production information, etc. However, over time these labels may become separated from the storage medium, such as the video tape cassette, thereby requiring a user to play the video tape and thereby visually identify the content. For user recorded content, the user is required to affix a blank label to the storage medium and note content identifying information on the blank label. Additionally, a user may note content identifying information on a storage medium carton for the purposes of identifying the content on the storage medium. This is a process that oftentimes is neglected by the user and results in storage medium or multiple storage mediums that contain recorded content that is not identifiable without visually reviewing the content on a reviewing device, such as a television, audio tape player, computer monitor, etc.

Even in a case wherein the storage medium or the storage medium carton contains information identifying the content of the storage medium, there is no ready way to identify a current viewing position of the content without starting the content at a beginning position. In the case of a digital storage medium, some positional information, such as frame data, etc., may be available for prerecorded content, but typically is not available for user recorded content. After starting the content portion from the beginning, such as by rewinding a video tape, a counter may be reset to identify the time sequential beginning of the storage medium. For example, for video tape, the video tape may be rewound to the beginning.

Regardless of the type of storage medium, resetting the counter at the content initial position causes the counter to contain storage medium time positional information that corresponds to the time sequential beginning of the content portion and/or the storage medium. Thereafter, when the content portion is played in a time sequential manner, fast-forwarded, etc., the counter will contain content time positional information that will correspond to the current time position of the content. However, if the current storage medium is replaced with a new storage medium, the above procedure must be repeated for the new storage medium so that the counter will contain the proper time positional information for the content contained on the new storage medium.

Time positional information is particularly important in a case wherein the storage medium contains more than one recorded program. In this case, when the user wishes to review content that does not start at a known place on the storage medium, the user may ensure that the storage medium begins at the initial position before the user resets the counter to reflect the storage medium initial position. For example, the user may rewind the video tape, etc., before resetting the video tape counter. Alternatively, the user may review a content portion at a current position, make a rough determination of the current sequential position of the reviewed content, and then reposition the sequential position of the content to find a desired content position. As a third alternative, the user may review the content at a normal or accelerated reviewing speed while sequentially repositioning the content to find the desired content position.

All of the above procedures are particularly cumbersome for a user. In some consumer equipment, some positional information may be available from the storage medium. For example, in some video cassette recorders (VCRs), indexing information can be recorded directly on a control track of a video tape. In the Video Indexing Search System (VISS), an indexing mark is placed on the control track of the video tape each time recording begins. The recorded index marks are not distinguishable from each other. In this way, if a user wishes to view the third recorded program on the video tape, the user can enter a fast forward or rewind mode to go a particular number of index marks forward or backward. However, this system has the disadvantage in that the user must still first identify where the video tape is presently positioned to determine how many index marks there are between the current position and the desired position on the video tape. In addition, this system only enables a user to proceed to the beginning portion of a content portion or to a content position wherein the user specified an additional index mark at the time of recording. This system does not enable a user to identify the content of the video tape or the current video tape position in the time domain.

In an alternate known system, Video Address Search System (VASS) pulses are stored on the control track of the video tape. The VASS pulses have an advantage over the VISS pulses in that the VASS pulses are distinct from each other. Accordingly, a user can fast forward or rewind to a given VASS pulse (e.g., go to VASS pulse three) without having to determine where the video tape currently resides. However, this system still does not help a user identify the video tape or the current video tape position in the time domain. In fact, both the VISS and the VASS pulses are more akin to a bookmarking system that provides no information on the recorded content.

In yet another known system, a time code is recorded on the control track of the video tape. This time code can be used for identifying the current position of the video tape in the time domain but does not help a user identify content stored on the video tape. For a digital storage medium, time domain positional information may be available from the storage medium yet again this does not help a user identify content stored on the storage medium.

In other known systems, keyframes are extracted from video sequences to facilitate video editing, storage, retrieval, commercial skipping, etc. For example, in U.S. patent application Ser. Nos. 08/867,140, 08/867,145, 09/220,277, and 09/123,444, to Dimitrova et. al., incorporated herein by reference, key frames are identified through the use of techniques such as cut detection, static scene detection, similar frame detection, black frame detection, text detection, commercial detection, etc. Extracted keyframes from a video sequence may help a user to identify the corresponding video sequence but do not help automatically identify the content or the storage mediums current reviewing position in the time domain.

Accordingly, it is an object of the present invention to overcome the disadvantages of the prior art.

It is a further object of the present invention to provide a method of facilitating the use and operation of a storage medium.

SUMMARY OF THE INVENTION

These and other objects of the present invention are achieved by a system that utilizes a determined time between characteristics from content for subsequently identifying the content and/or the corresponding content review position in the time domain. The system utilizes a database of previously stored times between characteristics from known content for matching to the determined time between characteristics from the content. The characteristics may correspond to video tape indexing data, keyframe data, audio characteristics, text occurrences, and/or other known characteristics from the content. When a match is found between the determined time between characteristics and the stored times between characteristics, the system identifies the content. In addition, if corresponding time domain data is stored in the database, the system identifies the current content review position in the time domain.

In accordance with the present invention, when the time between characteristics from the content does not match any of the times stored in the database, the system stores the current time between characteristics and corresponding content identifying information in the database for identifying the content at some subsequent time.

The characteristics from the content may be all one type of characteristic, such as index marks, keyframes, text occurrences, scene transitions, a given audio characteristic, etc. In addition, the characteristics may be any combination of the above and other known characteristic types.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of the present invention. The invention is best understood in conjunction with the accompanying drawings in which.

DETAILED DESCRIPTION OF THE INVENTION

In the discussion to follow, certain terms will be illustratively discussed in regard to specific embodiments or systems to facilitate the discussion. However, as would be readily apparent to a person of ordinary skill in the art, these terms should be understood to encompass other similar applications wherein the present invention could be readily applied. For example, the term content should be understood to include video content, audio content, text content, animation content, or any other content that may be reviewed, received, recorded, played, etc., in a given sequential manner. In addition, content should be understood to include any combination of the above content types, such as audio visual content. The terms storage medium, memory, etc., should be understood to include linear storage mediums, such as video tapes, audio tapes, etc., random access storage mediums, such as hard disks, digital versatile discs, other optical storage mediums, integrated circuit storage mediums, etc. The term sequential content should be understood to mean that the content, in some mode of operation, may be reviewed (e.g., watched, listened to, read, etc.) in a sequential manner wherein the reviewing activity duration may be measured in the time domain. For example, sequential content should be understood to include all of the above time sequential content. In addition, sequential content may not strictly depict content occurring in a time sequential manner, such as time lapse content, content that changes time references, etc. A time sequential beginning of content should be understood to include setting a storage medium to be reviewed at an initial position of a stored content portion. Content characteristic should be understood to include any characteristic that may be detected from a content portion. For instance, scene transitions in video content may be detected, black frames may be detected, the occurrence of text may be detected, the occurrence, position, size, and motion of distinct image regions (e.g., face regions, text regions, etc.) may be detected. In addition, it is known in the art that these characteristics of the video content may be utilized for detecting particular frames of the content such as key frames. For audio content, audio signal characteristics such as short time energy, band energy ratio, pause rate, pitch, signal amplitude, etc. may be detected during content portions. For other content, other known characteristics may also be detected. The term non-periodic, as used herein, should be understood to mean non-cyclic or not occurring in regular intervals.

Figure 1:
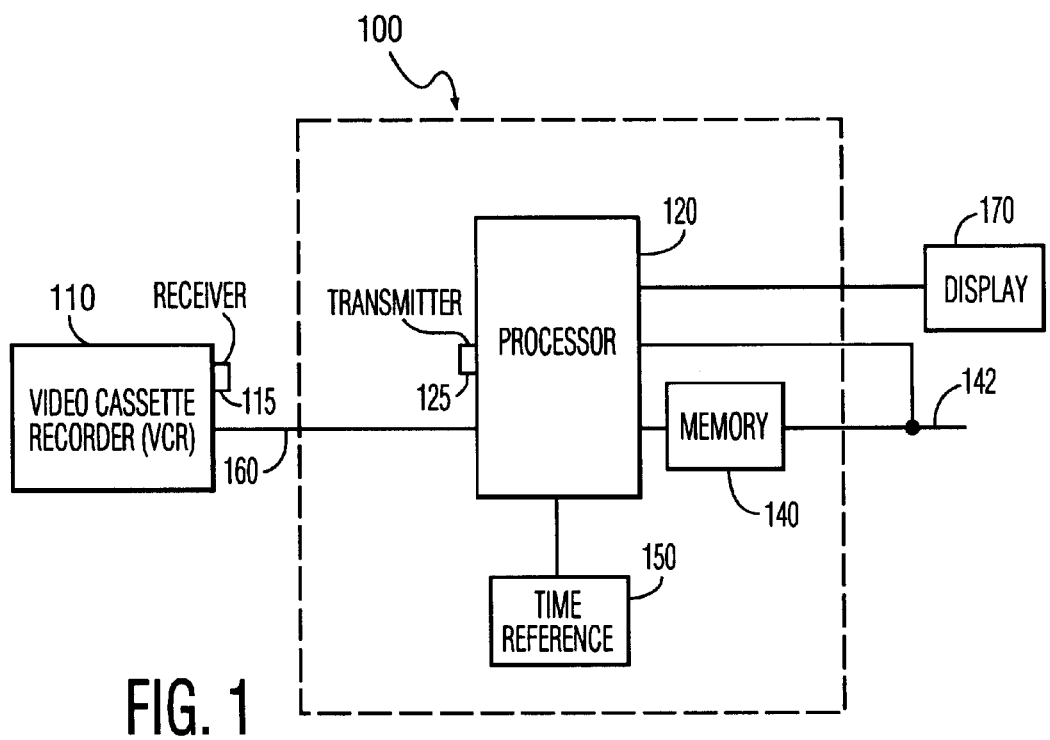
FIG. 1 shows an illustrative identifying system in accordance with an embodiment of the present invention.

FIG. 1 depicts an illustrative identifying system 100 in accordance with an embodiment of the present invention. For the purposes of the following discussion, the term played will be utilized herein below as an example of a reviewing process to facilitate the discussion to follow. However, the term played should be understood to encompass all manners of reviewing content portions in a sequential manner.

The identifying system 100 contains a processor 120, a memory 140, and a time reference 150. The memory 140 is utilized for storing timing information and corresponding content identifying information related to, for example, previously played content portions as described in more detail below. In addition, the timing information and corresponding content identifying information may be provided to the memory from an alternate input 142, such as an Internet connection, for prerecorded content. In another embodiment, the timing information and corresponding content identifying information may be included at an initial or known position of a content portion, etc. Herein, the term known content should be understood to include content wherein the identification system has previously stored timing information corresponding to the content regardless of the source of the timing information.

In operation, a medium containing content (e.g., a video cassette) is placed in a content source, such as a video cassette recorder (VCR) 110, and a play function is initiated. The play function may be initiated, for instance, by depressing a play button on the VCR 110, by depressing a play button on a remote control (not shown), by initiating a cassette tape query or play function on the identifying system 100, or any other known system. After a play function is initiated, the processor 120 receives content data from the video tape through a data line 160. The content data contains characteristics that may be detected by the processor 120 for the purposes of operating in accordance with the present invention.

In the following discussion, indexing marks are illustratively discussed as one known type of characteristic that may be detected from video content. Index marks will be discussed herein below in terms of the present invention for the purposes of facilitating the discussion. However, as would be readily apparent to a person of ordinary skill in the art, any system in which non-periodic characteristics that are associated with (e.g., on a control track of a video tape), part of, and/or may be determined from a given content portion and content type, may also by utilized in accordance with the present invention. Accordingly, in the following discussion, the term index mark should be understood to encompass these other characteristics that are known in the art.

The indexing marks may be previously recorded on the video cassette at the time of cassette manufacture, during the time that content is recorded on the video cassette, or ma y be directly associated with the content. Illustratively, the indexing marks may correspond to VISS indexing marks, VASS indexing marks, or any other indexing system or non-periodic data occurring on the video tape. The processor 120 utilizes the indexing marks to identify the video cassette tape position that corresponds to each index mark and/or the tape identity as described in more detail below.

After the processor 120 receives and identifies an index mark, such as the first index, the processor 120 starts the time reference 150 so that the time between index marks may be determined. After a second or later index mark is received and identified, the processor 120 stops the time reference 150 and queries the time reference 150 to determine the time between the first and second or later index marks. The identifying system 100 operates utilizing the premise that each time between index marks is unique since the index marks are not recorded on the video tape in a regularly occurring timing pattern. Since each time between index marks is unique, any of the times between index marks may be utilized for identifying a corresponding video cassette/tape and the content stored therein/thereon.

Once the time between index marks is determined, the processor 120 may query the memory 140 to determine if the currently determined time between index marks corresponds to any previous times between index marks that are stored in the memory 140. In the event that the currently determined time between index marks does not correspond to previous stored times between index marks, the tape identifying system 100 stores the currently determined time between index marks. In addition, the tape identifying system 100 associates tape identifying information together with the currently determined time between index marks, for instance, by querying the user to provide the tape identifying information. The tape identifying information may include a title for the video cassette and also may include a description of any or all of the content stored thereon. The identifying system 100 then stores the currently determined time between index marks and the tape identifying information together in the memory 140, in associated portions of the memory 140, or in a separate associated memory (not shown).

During the time between receipt of the index marks, the identifying system 100 may interact with the VCR 110, for instance through use of a transmitter/receiver (e.g., infra-red transmitter/receiver) 125, 115 or directly through a wired control connection (not shown). As an example, the identifying system 100 may send a command to the VCR 110 to put the VCR 110 into an fast forward scanning mode, an accelerated viewing speed, or any other accelerated video tape playing mode to reduce the time between index marks. Any of the above modes may be utilized as long as the VCR 110 can read the indexing marks from the video cassette during the accelerated video tape playing mode. The mode that is best supported by the VCR 110 (e.g., which ever mode results in the shortest time between index marks) may be the mode that the identifying system 100 will command the VCR 110 to go into. The identifying system 100 may be instructed as to which mode is supported by the VCR 110, for instance during an initial setup of the identifying system 100.

Whichever mode is utilized for determining the time between index marks, should be utilized each time that the identifying system 100 determines the time between index marks so that the determined time between index marks corresponds to the stored time between index marks.

In a particular embodiment, when the currently determined time between index marks does not correspond to any times between index marks previously stored in the memory 140, the identifying system 100 may command the VCR 110 to scan through more of the video tape. In this way, the processor 120 may determine the time between additional index marks that are on the video tape and store, in the memory 140, the time between the additional index marks together with the corresponding tape identifying information.

In yet another embodiment, the processor 120 may store the time between each of the index marks on the video tape. In this way, the identifying system 100 may identify a video tape in the least amount of time regardless of the video tapes position at the time that it is inserted into the VCR 110. In this embodiment, the tape identifying system 100 may cause the video cassette to rewind to the beginning or some other determined portion of the video tape. At this time, the time reference 150, or a time reference or displayed index reference resident on the VCR 110 may be initialized. In another embodiment, the processor 120 may note the current indication of the time reference 150, etc. instead of resetting the time reference 150. Thereafter, as the identifying system 100 stores the time between each of the index marks on the video cassette, the processor 120 may also store the corresponding time or a corresponding indication of the video tape in the time domain at the occurrence of the index mark.

In the event that the currently determined time between index marks does correspond to a previously stored time between index marks, the processor 120 identifies the current video tape and provides corresponding tape identifying information to the user. In the event that the identifying system 100 has previously stored the corresponding time or the indication of the video tape in the time domain at the occurrence of the index mark, the identifying system 100 may also identify the current video tape position in the time domain. Alternatively, the identifying system 100 may only identify the video tape position in the time domain without providing corresponding tape identifying information to the user.

In one embodiment, the identifying system 100 displays the current video tape identifying information and/or video tape position on a display 170. The display 170 may be a digital display such as a light emitting diode (LED) display, a liquid crystal display (LCD), a cathode ray tube (CRT) display, such as a television display, etc., an may be incorporated into or separate from the identifying system 100. In an other embodiment, the identifying system 100 controls the VCR 110 to reset video tape positional indicators resident on the VCR 110 to indicate the proper video tape positional information in the time domain. In an other embodiment, the identifying system 100 controls the VCR 110 to indicate the proper video tape positional information as an absolute number not related to time. As previously discussed, the identifying system 100 may control the VCR 110 through the use of the transmitter/receiver 125, 115 or by sending control information to the VCR 110 through the data line 160 or through the alternate control line (not shown).

Figure 2:
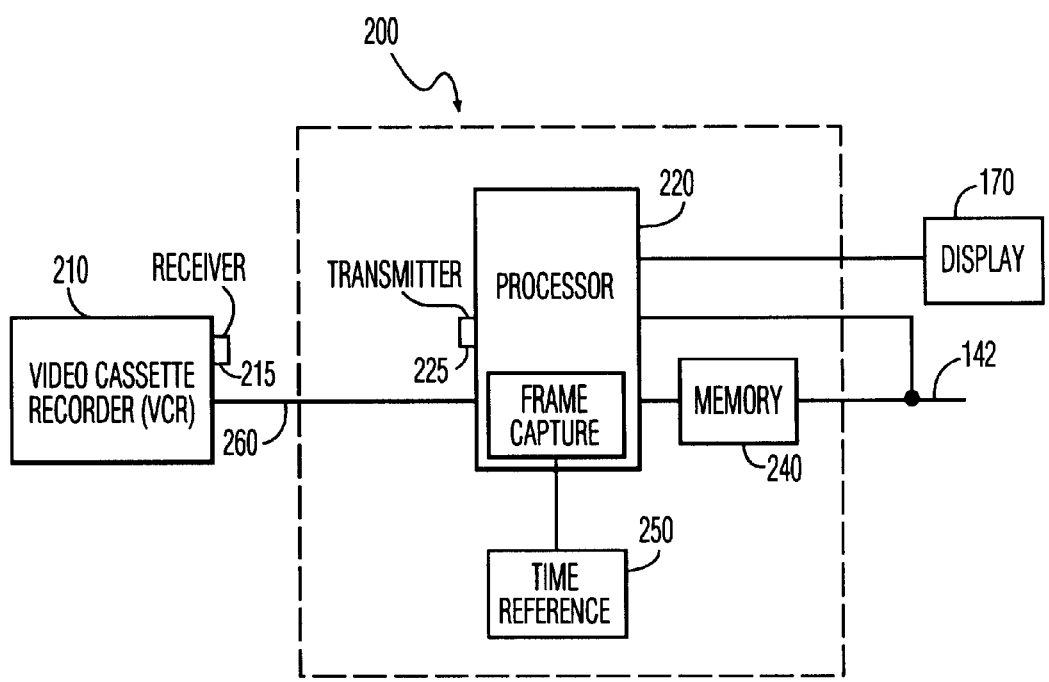
FIG. 2 shows an illustrative identifying system in accordance with an alternate embodiment of the present invention.

FIG. 2 shows an alternate embodiment in accordance with the present invention in which to identify a characteristic of a video portion, it is desirable to locally store a portion of the content. For example, in identifying a characteristic such as keyframes of video content, it may be desirable to locally store each frame of the video to enable identification of the keyframes. In this way, in accordance with the present invention, particular frames are identified and the timing between the particular frames may be utilized to enable identification of the video tape, the content stored therein, and/or the video tapes current position in the time domain. Accordingly, an identifying system 200 contains a processor 220 having a content segment capture device, illustratively shown as a frame capture 230, for locally storing a portion (e.g., a frame) of the video content. It is known in the art that many different characteristics may be identified from recorded content, such as a video content portion. For instance, scene transitions in the recorded content may be detected, black frames may be detected, text occurrence may be detected, etc. (as discussed above). These characteristics may be identified and the timing between these characteristics may be utilized in a similar way as the timing between index marks is utilized as described above.

For the purposes of simplifying the following discussion, the present invention is discussed herein below in terms of extracting keyframe data from recorded video content. Accordingly, the keyframe data is the characteristic that is identified in the illustrative discussion that follows. As would be appreciated by a person of ordinary skill in the art, the present invention may readily utilize any characteristics of the content that may be identified. As in the identifying system 100, the identifying system 200 also contains a processor 220, a memory 240 and a time reference 250. In the following discussion, only the features of the identifying system 200 that differ with the identifying system 100 will be discussed in any detail.

In operation, after a video tape play function is initiated, the processor 220 begins receiving content from a content source, such as a VCR 210 via a data line 260. The frame capture 230 receives content in the form of a video stream. The frame capture 230 extracts pixels from the video stream to form video frames. The processor 220 examines the video frames to select keyframes from the video frames. Keyframes may be selected from the video content in any of the many ways in which it is known to select keyframes in the art. Whichever known system is utilized by the processor 220 for selecting the keyframes from the video content should be utilized each time so that the identifying system 200 can repeatedly select the same keyframes from a given content portion.

In a particular embodiment, in accordance with the present invention, it may be desirable to eliminate some characteristics (e.g., keyframes) from consideration. For instance, some characteristics of the recorded content may be repetitive among different content portions and therefore may lead to improper identification of the content. For example, within recorded video content, portions of the video content may contain commercials that may also be repeated during other portions of the video content or during portions of completely different video content. If multiple characteristics were extracted from the commercial and where utilized to identify the video content, a system in accordance with the present invention may erroneously identify one video portion as another. Accordingly, it may be desirable to eliminate certain content portions that may tend to provide erroneous identification results. For example, it is known in the art that particular frames of recorded video content may be first identified and thereafter, the selected frames may be filtered to remove frame data from content sequences that may commonly be found in the recorded content, such as commercial sequences.

In one embodiment, after selecting two or more keyframes, and determining a corresponding time between two or more keyframes, the processor 220 queries the memory 240 to determine if the currently measured time between keyframes corresponds to keyframe timing data previously stored in the memory 240. In the event that the current keyframe timing data does not correspond to keyframe timing data previously stored in the memory 240, the processor 220 stores the current keyframe timing data in the memory 240 together with video cassette identifying information obtained as discussed herein above. In addition, the processor 220 may obtain additional keyframes and corresponding keyframe timing data from the VCR 210 for storage together with the previously stored data and video cassette identifying information to facilitate subsequent identification of the video cassette. Further, the processor 220 may start the time reference 250 or note an initial time indication on the time reference 250 for the purposes of storing a time indication together with the keyframe timing data in the memory 240.

In a particular embodiment, the identifying system 200 causes the video tape to rewind to an initial or known position for the purposes of having the stored time indication/indications correspond to a keyframe's position on the video tape in the time domain. In this way, when current keyframe timing data matches keyframe timing data stored in the memory 240, the identifying system 200 may identify the current video cassette and/or the current video tapes position in the time domain.

Some known VCR's record a time code directly on the control track of the video tape. When the identifying system 200 is used in conjunction with a VCR that records a time code directly on the control track of the video tape, the identifying system 200 may store the time code together with corresponding keyframe timing data in the memory 240. In this embodiment, the identifying system 200 may utilize the stored time code and keyframe timing data for the purposes of matching to subsequent time code and keyframe timing data and thereby, identify the video cassette at some future time.

Finally, the above-discussion is intended to be merely illustrative of the invention. Those having ordinary skill in the art may devise numerous alternative embodiments. For example, although the above discussion illustratively discussed determining timing information between characteristics identified from video content, as a person of ordinary skill in the art would readily appreciate, the present invention may be suitably utilized for any other content that is known in the art that contains non-periodic identifiable characteristics. For instance, the present invention may be suitably utilized for identifying audio content. Characteristics of the audio content may be identified by characteristics including short time energy, band energy ratio, pause rate, pitch, etc. Other characteristics using Fourier transform and/or Mel Spectrum Frequency coefficients may also be utilized. In addition, a weighted combination of these characteristics may also be utilized to determine suitable characteristics from the audio content. The characteristics may be identified utilizing a sliding window of N milliseconds with an overlapping of M milliseconds. Illustratively N may be selected to be 45 milliseconds and M could be selected as 30 milliseconds. In this embodiment, the characteristic capture device 230 may capture content over a period of time for the purposes of identifying given content characteristics. Regardless of the parameters that are utilized for identifying the audio characteristics, as discussed above with regards to video characteristics, the same parameters should be utilized each time so that the same characteristics are identified each time the audio content is reviewed.

In addition, although in the above discussion, a single type of characteristic is identified in a given embodiment (e.g., index marks, keyframes, etc.), as would be readily appreciated by a person of ordinary skill in the art, a multitude of characteristics may be identified from a given content portion/type. In an alternate embodiment, the timing between any of these varied characteristics may be utilized in accordance with the above described invention. For example, the time between an index mark and a keyframe may be utilized as one timing measurement that is stored in the memory. The time between a video characteristic and an audio characteristic for audio visual content may also be utilized as another timing measurement that is stored in the memory. As is clear to a person of ordinary skill in the art, any combination of characteristics may be suitably utilized in accordance with the present invention. In addition, although the source of content is illustratively shown as the VCR 210, clearly other sources of content could readily be utilized in accordance with the present invention. Other sources could include random access memory (RAM), a digital video cassette recorder (DVCR), a non-removable media recorder, such as a TIVO™, digital versatile discs (DVD) including DVD RAM, compact disc read only/read and write memory (CD-ROM, CDR, CDRW), digital audio tape (DAT), the Internet, cable, satellite, as well as other memory devices as defined herein above.

In an embodiment wherein the source of content is a transmission medium (e.g., cable, Internet connection, etc.), the input 142 may serve as an alternate or additional connection to the transmission medium for receiving content by the processor, for example as shown in FIG. 1. In this embodiment, the content may be stored at a remote site including a remote server, such as an Internet server, a remote service provider site, such as a video on-demand service provider, etc. In this or alternate embodiments, the content may be received from live content feeds, such as a live camera feed, live audio feed, etc. In these embodiments, the memory or another memory may be utilized for storing the content contained within the live content feed.

In the discussion above, the present invention is discussed in terms of identifying content for a user. This should be generally understood to include use of the invention to facilitate identification of content for the purposes of determining if the intellectual property rights of an owner of a given content portion are infringed. As an example, an identifying device in accordance with the present invention may be utilized to automatically identify illegitimate copies of copy protected content contained at an Internet site. In accordance with this embodiment, the memory may contain a program search routine utilized by the processor for searching the Internet via the input 142. Utilizing the program, the processor may retrieve content portions from the Internet and extract characteristics and timing information as discussed above with regard to other embodiments. In a case wherein a retrieved content portion is identified, the processor may thereafter determine if the source of the content portion is an illegitimate source. For illegitimate sources that are identified by the processor, the processor may produce an indication on the display of the content portion and the source of the content portion.

Although the source of content and the identifying system are illustratively shown as two separate devices, clearly it would be within the capability of a person of ordinary skill in the art to combine these devices into a single device. Further, although the time reference is shown as a separate device from the processor, clearly the time reference may be a function incorporated into the processor as a software, and/or hardware function. Other combinations of characteristics may also be suitably utilized without departing from the spirit and scope of the following claims.

In interpreting the appended claims, it should be understood that:

a) the word "comprising" does not exclude the presence of other elements or acts than those listed in a given claim;

b) the word "a" or "an" preceding an elment does not exclude the presence of a plurality of such elements;

c) any reference signs in the claims do not limit their scope; and d) several "means" may be represented by the same item or hardware or software implemented structure or function.

The claimed invention is:

1. A method of identifying an unknown content portion, comprising:

processing at least one content portion to determine a time between characteristics detected from the at least one content portion;

storing the determined time between characteristics;

processing the unknown content portion to determine a time between characteristics detected from the unknown content portion; and identifying the unknown content portion as being the same as the at least one content portion when the determined time between characteristics from the unknown content portion matches the stored determined time between characteristics from the at least one content portion.

2. The method of claim 1, wherein the identifying of the unknown content portion comprises querying a memory to obtain the stored determined time between characteristics from the at least one content portion.

3. The method of claim 2, wherein if the determined time between characteristics from the unknown content portion does not match the stored determined time between characteristics from the at least one content portion, the method further comprises:

storing the determined time between characteristics from the unknown content portion; and associating content identifying information with the stored determined time between characteristics from the unknown content portion.

4. The method of claim 3, wherein the associating of the content identifying information comprises requesting the content identifying information from a user.

5. The method of claim 1, wherein the at least one content portion comprises video content and the characteristics detected from the at least one content portion comprise at least one of key frames, index marks, and scene cut rates.

6. The method of claim 1, wherein the identifying of the unknown content portion comprises identifying the unknown content portion in the time domain.

7. The method of claim 1, wherein the at least one content portion is stored on one of a plurality of content sources, and wherein the processing of the at least one content portion comprises:

identifying a plurality of characteristics from the one content source; and determining times between each of the plurality of characteristics from the one content source; and wherein the identifying of the unknown content portion comprises:

playing a selected one of the plurality of content sources;

determining a time between characteristics detected from the selected one of the plurality of content-sources; and determining if the time between the characteristics detected from the selected one of the plurality of content sources matches any of the stored times from the one content source.

8. The method of claim 1, wherein the characteristics detected from the at least one content portion and from the unknown content portion comprise Video Indexing Search System (VISS) pulses.

9. The method of claim 1, wherein the characteristics detected from the at least one content portion and from the unknown content portion comprise Video Address Search System (VASS) pulses.

10. The method of claim 1, wherein the characteristics detected from the at least one content portion and from the unknown content portion comprise at least one of audio characteristics, text occurrences, and scene transitions.

11. The method of claim 1, wherein the unknown content portion is stored on one of a video cassette recorder (VCR), a digital video cassette recorder (DVCR), and a digital versatile disc (DVD).

12. A method of identifying an unknown content portion comprising:

determining a time between characteristics from the unknown content portion;

comparing the determined time to a database of stored times between determined characteristics for a plurality of known content portions; and identifying the unknown content portion if the determined time thereof matches at least one of the stored times.

13. The method of claim 12, wherein if the determined time does not match at least one of the stored times, the method further comprises:

storing the determined time; and associating content identifying information with the stored determined time.

14. The method of claim 13, wherein the associating of the content identifying information comprises requesting the content identifying information from a user.

15. An apparatus for identifying an unknown content portion, comprising:

a processor configured to determine a time between characteristics detected from the unknown content portion, and configured to identify the unknown content portion by comparing the determined time to a database of stored times between characteristics for a plurality of known content portions, and identifying the unknown content portion if the determined time matches at least one of the stored times.

16. The apparatus of claim 15, further comprising:

a memory configured to store the determined time between characteristics of the plurality of known content portions, wherein the processor is configured to query the memory and to identify the unknown content portion if the determined time between characteristics detected from the unknown content portion matches the at least one of the stored times between characteristics of the plurality of known content portions.

17. The apparatus of claim 16, wherein the processor is configured such that if the determined time between characteristics detected from the unknown content portion does not match the at least one of the stored times between characteristics of the plurality of known content portions, the processor is configured to:

store the determined time between characteristics detected from the unknown content portion in the memory; and associate content identifying information to the stored determined time between characteristics detected from the unknown content portion.

18. The apparatus of claim 15, wherein the plurality of known content portions comprise video content and the characteristics comprise at least one of key frames, index marks, and scene cut rates.

19. The apparatus of claim 15, wherein the characteristics comprise at least one of audio characteristics, text occurrences, and scene transitions.

20. The apparatus of claim 15, wherein the plurality of known content portions are stored on one of a video cassette recorder (VCR), a digital video cassette recorder (DVCR), and a digital versatile disc (DVD).

21. The apparatus of claim 15, wherein the processor is configured to identify the unknown content portion in a time domain.

22. The apparatus of claim 15, wherein the apparatus is configured to receive the unknown content portion from a remote server.

23. The apparatus of claim 15, wherein the apparatus is configured to receive the unknown content portion from a live content source.

24. The apparatus of claim 23, comprising a memory configured to store the unknown content portion from the live content source.

25. The apparatus of claim 24, wherein:

the memory is configured to store the time between characteristics of at least one of the plurality of known content portions; and the processor is configured to query the memory and to identify the unknown content portion if the determined time between characteristics for the unknown content portion matches the at least one of the stored times.

* * * * *